United States Patent [19]
Miyata

[11] Patent Number: 5,665,018
[45] Date of Patent: Sep. 9, 1997

[54] BELT TRANSMISSION

[75] Inventor: Hirofumi Miyata, Kobe, Japan

[73] Assignee: Bando Chemical Industries, Ltd., Kobe, Japan

[21] Appl. No.: 512,650

[22] Filed: Aug. 8, 1995

[30] Foreign Application Priority Data

Aug. 12, 1994 [JP] Japan .................. 6-190209

[51] Int. Cl.⁶ .................................................. F16H 9/00
[52] U.S. Cl. ........................................................ 474/74
[58] Field of Search .............................. 474/13–15, 29, 474/70, 74

[56] References Cited

U.S. PATENT DOCUMENTS

| | | | |
|---|---|---|---|
| 3,803,313 | 4/1974 | Davis | 226/49 |
| 4,327,597 | 5/1982 | Soto | 74/113 X |
| 4,487,085 | 12/1984 | Collins | 74/113 |
| 4,725,259 | 2/1988 | Miyata | 474/70 |
| 4,789,153 | 12/1988 | Brown | 272/73 |
| 4,912,993 | 4/1990 | Konishi et al. | 74/7 A X |
| 5,181,888 | 1/1993 | Takahashi et al. | 474/107 X |

*Primary Examiner*—Roger J. Schoeppel
*Attorney, Agent, or Firm*—Sixbey Friedman Leedom & Ferguson; Gerald J. Ferguson, Jr.; Thomas W. Cole

[57] ABSTRACT

In a belt transmission device for preventing a slip of a belt, the belt is wound between a crank pulley of an engine and an alternator pulley on an alternator shaft connected to an alternator as an auxiliary for making belt transmission. The alternator pulley is attached to the alternator shaft through a one-way clutch for connecting the alternator pulley and the alternator shaft only at the time of increase in angular velocity of a crank shaft. A centrifugal clutch which becomes engaged by the increase in centrifugal force accompanied with rotation of the alternator shaft is arranged in parallel with the one-way clutch. When the angular velocity is small, the centrifugal clutch is disconnected but only the one-way clutch is connected. When the angular velocity becomes larger than an allowable frequency of the one-way clutch, the centrifugal clutch operates to block the function of the one-way clutch.

5 Claims, 7 Drawing Sheets

BELT TRANSMISSION

BACKGROUND OF THE INVENTION

This invention relates to a belt transmission method for transmitting a rotational force of a driving rotary shaft accompanied with a slight variation in angular velocity (speed variation) to a driven-rotary shaft having rotational inertia via a belt, and relates to a device in which the above method is used.

In general, an engine (internal-combustion engine) generates driving energy only in an explosion stroke but no rotational torque in any other strokes, so that its crank shaft generates a variation in angular velocity at any time. Accordingly, in the case that the rotational torque of the engine is transmitted to the other driven rotary shaft through a belt, influences from the variations in angular velocity become more outstanding as the driven rotary shaft is increased in load.

More specifically, in a belt transmission device which is driven by an engine, a variation in angular velocity of the crank shaft synchronizes with a variation in peripheral velocity of the belt. Therefore, when the driven shaft has large rotational inertia, a slip due to the variation in peripheral velocity occurs between a pulley on the driven rotary shaft and the belt. This remarkably shortens a durable life of the belt.

For example, when an alternator as an generator which is one of auxiliaries of an automobile is driven by belt transmission with use of an engine as a driving source, an alternator shaft has large rotational inertia. Thus, the belt repeatedly generates slight slips on the pulley of the alternator shaft due to variations in angular velocity which is typical of the engine. The slips provide various kinds of troubles such as abrasion of the contact surface, heat generation due to friction, generation of noise and the like. Further, since the alternator shaft is generally provided with a pulley larger in diameter than that of the crank shaft of the engine to have a velocity ratio of increasing in velocity with respect to the crank shaft, the above-mentioned troubles become more outstanding.

In particular, if the belt is a V-ribbed belt to be applied for the purpose of compaction of its occupying space, the abrasion of the belt surface directly results in remarkably shortening the durable life of the V-ribbed belt. In this case, prevention of the slips is impossible.

To deal with the above troubles, common engines employ a method of providing a flywheel on the crank shaft to increase its inertial force so that a smooth running may be accomplished. However, since the crank shaft has a limitation in its torsional strength, the increase in inertial force is also limited. It cannot be avoided that in a gasoline engine, its crank shaft generates variations in angular velocity of about 1.5 to 2.0° at maximum, and in a diesel engine, its crank shaft generates variations in angular velocity of about 6° to 8° at maximum.

Further, in order to improve a transmission belt in its structure and strength, various kinds of attempts have been conventionally made thereby obtaining certain effects. However, as mentioned above, since it is impossible to completely avoid variations in angular velocity of the driving rotary shaft, reduction in abrasion of the belt and reduction in generation of sounds by the above conventional attempts mean only that they have been performed to a certain extent.

To solve the problem, Applicant has previously proposed, in a belt transmission technique accompanied with such variations in angular velocity of the rotary shaft, a device in which a one-way clutch is interposed between the rotary shaft and a pulley. According to this device, power transmission from the driving rotary shaft only in a normal direction is performed by a connecting operation of the one-way clutch and a rotational force in a relatively reverse direction is broken by a disconnecting operation of the one-way clutch, so that it is prevented that an excessive stress acts on the belt thereby accomplishing an extended belt life and reduction in sound (See Japanese Patent Application Laid-Open Gazette No.61-228153).

However, the proposed device also has some problems. In detail, when the proposed belt transmission device having the one-way clutch is used in order to drive, for example, auxiliaries of the automobile, a required frequency for the one-way clutch is 23 to 26 Hz in an idle rotational area of 700 to 800 rpm of a 4-cycle 4-cylinder engine while a required frequency for the one-way clutch is 186 to 200 Hz in a maximum rotational area of 5600 to 6000 rpm of the engine.

On the other hand, when the one-way clutch is a roller type one, its allowable frequency is at most 60Hz. Accordingly, though no trouble occurs in the idle rotational area of the engine, the frequency of the one-way clutch exceeds the allowable frequency at the time of high-speed rotation thereby presenting breakage of a preload spring of the clutch or the like. In other words, the above-proposed belt transmission device has disadvantages in durability and reliability of the one-way clutch.

The present invention has been made in view of the foregoing problems and has its object of enhancing the durability of a one-way clutch while accomplishing reduction in noise and an extended belt life by the one-way clutch in such a manner as not to transmit to the one-way clutch a variation in angular velocity at a high frequency exceeding the allowable frequency of the one-way clutch.

SUMMARY OF THE INVENTION

To attain the above object, in the present invention, a centrifugal clutch which becomes in a connection state by the increase in centrifugal force due to rotation is arranged in parallel with a one-way clutch, wherein when an angular velocity is small, the centrifugal clutch is disconnected but only the one-way clutch is connected, and when the angular velocity is large, a connecting operation of the centrifugal clutch blocks the function of the one-way clutch.

More specifically, a first invention is a belt transmission method of transmitting a rotational force of a driving rotary shaft accompanied with a slight variation in angular velocity to a driven rotary shaft having rotational inertia through a transmission belt. The method comprises the steps of: when one of the driving and driven rotary shafts is 0smaller in angular velocity than a set value, selectively breaking transmission of rotation from one to the other between the belt and the rotary shaft only at the time of decrease in angular velocity of the driving rotary shaft; and when the angular velocity of the driving rotary shaft is the set value or more, allowing transmission of rotation from one to the other between the belt and the rotary shaft.

A second invention is a belt transmission device in which pulleys are provided with a driving rotary shaft accompanied with a slight variation in angular velocity and a driven rotary shaft having rotational inertia respectively, a transmission belt is wound between both the pulleys and at least one of the pulleys on the driving and driven rotary shafts is attached to the rotary shaft through a clutch device.

In addition, the clutch device comprises: a one-way clutch for connecting the pulley and the rotary shaft so as to integrally rotate them only in the case of increase in angular velocity of the driving rotary shaft; and a centrifugal clutch, provided in parallel with the one-way clutch on a transmission path, for disconnecting the pulley and the rotary shaft when the angular velocity of one of the rotary shafts is smaller than a set value and for connecting the pulley and the rotary shaft so as to integrally rotate them when the angular velocity of the driving rotary shaft is the set value or more.

In the above inventions, when the angular velocity of one of the rotary shafts is smaller than the set value, the centrifugal clutch of the clutch device is not operated to disconnect the pulley and the rotary shaft and the pulley and the rotary shaft are connected only through the one-way clutch arranged in parallel with the centrifugal clutch.

In the conventional belt transmission device having no one-way clutch, if the driven rotary shaft has a large rotational inertial force, it cannot follow the change from an increasing area to a decreasing area of variation in angular velocity and the angular velocity of the driven rotary shaft becomes larger than that of the belt due to its inertial force. The difference in angular velocity from each other generates a slip of the belt. In the present invention, however, the one-way clutch connects the pulley and the rotary shaft only in the increasing area of the angular velocity to transmit a driving force. On the other hand, when the angular velocity of the driving rotary shaft is decreased, transmission from the driving rotary shaft to the driven rotary shaft is broken and the rotation of the driven rotary shaft which momentarily becomes a higher speed with respect to the driving rotary shaft is allowed. Accordingly, the belt contacts only a pulley having a rotational inertial force far lower than the driven rotary shaft, so that no slip generates or only a slight slip due to an inertial force of only the pulley generates in spite of the maintenance of the connection state between the pulley and the belt. This presents an extended belt life and prevents generation of sounds. Further, since the angular velocity of the driven rotary shaft is held high even when the angular velocity of the driving rotary shaft is decreased, the angular velocity of the driven rotary shaft becomes higher than that of the pulley as a whole thereby increasing the angular velocity of the driven rotary shaft.

On the contrary, when the angular velocity of the driving rotary shaft is the set value or more, this accompanies the increase in centrifugal force thereby making the centrifugal clutch in its connection state. The centrifugal clutch connects the pulley and the rotary shaft so as to integrally rotate them. The connection by the centrifugal clutch blocks the function of the one-way clutch in spite of a variation in angular velocity. Accordingly, in view of a point that the function of the one-way clutch is blocked when the angular velocity of the rotary shaft becomes the set value or more, if the set value is set to an allowable frequency of the one-way clutch or less, the one-way clutch does not operate over the allowable frequency thereby enhancing the durability of the one-way clutch.

Further, in the connection state of the centrifugal clutch, the pulley and the rotary shaft are directly connected so as to rotate integrally so that the driven rotary shaft receives a variation in angular velocity of the driving rotary shaft. Since the angular velocity at that time is large and therefore the variation in angular velocity is relatively small, the variation in angular velocity does not affects the extension of belt life and the reduction in sound as a whole.

Furthermore, since the centrifugal clutch operates to connect the pulley and the rotary shaft so as to integrally rotate them when the angular velocity of the driving rotary shaft becomes the set value or more, it can be prevented that the driven rotary shaft having rotational inertia excessively rises its number of rotations, thereby securing the state that the maximum number of rotations is restricted.

In detail, the above clutch device is interposed between the driven rotary shaft and the pulley on the driven rotary shaft, and the one-way clutch of the clutch device is disposed between the driven rotary shaft and the pulley rotatably supported on the driven rotary shaft via a bearing.

On the other hand, the centrifugal clutch comprises a clutch connection part which is formed on the driven rotary shaft so as to rotate integrally with the driven rotary shaft and has a friction surface at an inner periphery thereof, at least one weight which is supported to the pulley so as to be movable in a radial direction of the pulley and has a friction surface engageable with the friction surface of the clutch connection part at an outer periphery thereof, and pressing means for forcibly pressing the weight radially inward, wherein the weight moves radially outward by a centrifugal force so that the friction surface thereof is engaged with the friction surface of the clutch connection part.

According to the above structure, when the angular velocity of the driving rotary shaft is lower than the set value, a centrifugal force acting on the weight is small in the centrifugal clutch of the clutch device interposed between the driven rotary shaft and the pulley on the driven rotary shaft. Therefore, the weight moves radially inward by the pressing force of the pressing means so that its friction surface of the outer periphery is not engaged with the friction surface of the inner periphery of the clutch connection part formed on the driven rotary shaft so as to rotate integrally with it, thereby making the centrifugal clutch in non-operating state. This removes the connection of the pulley and the driven rotary shaft by the centrifugal clutch so that they are connected only through the one-way clutch.

On the contrary, when the angular velocity of the driving rotary shaft becomes the set value or more, its accompanying increase in centrifugal force moves the weight of the centrifugal clutch radially outward against the pressing force of the pressing means so that the friction surface of the outer periphery of the weight is engaged with the friction surface of the inner periphery of the clutch connection part, thereby making the centrifugal clutch in an operation state. The operating centrifugal clutch connects the pulley and the driven rotary shaft so as to integrally rotate them. In this way, the structure of the centrifugal clutch or the like can be readily obtained.

Further, the driving rotary shaft is composed of a crank shaft of an engine (internal-combustion engine) and the driven rotary shaft is composed of a shaft connected to an auxiliary driven by the engine.

According to the above structure, in the case of transmitting a driving force of the crankshaft of the engine to the auxiliary through belt transmission to drive the auxiliary, even if a variation in angular velocity generates at the crank shaft, the variation in angular velocity is absorbed by the one-way clutch in a low rotational speed area of the engine so that a slip of the belt is restricted thereby accomplishing an extended belt life and reduction in sound. On the other hand, in a high rotational speed area of the engine, the centrifugal clutch rigidifies the pulley and the driven rotary shaft thereby enhancing the one-way clutch in its durability and reliability.

Furthermore, it is preferable that the auxiliary is an alternator. Accordingly, as described above, since the alternator is connected to the driven rotary shaft having, as a whole, a higher angular velocity than the pulley with the one-way clutch operated, the alternator is increased in generating efficiency.

In addition, since the pulley and the alternator are connected through both the one-way clutch and the centrifugal clutch, even if the one-way clutch causes an operational failure so that power transmission is not made between the pulley and the driven rotary shaft, the alternator generates no electric power when the angular velocity is low. If the failure of generation of electric power is detected, the defects of the one-way clutch can be detected. On the other hand, when the angular velocity becomes the set value or more, the centrifugal clutch operates to make power transmission between the pulley and the driven rotary shaft thereby securing a minimum amount of generation of electric power by the alternator.

DESCRIPTION OF THE PREFERRED EMBODIMENTS

Figure 3:
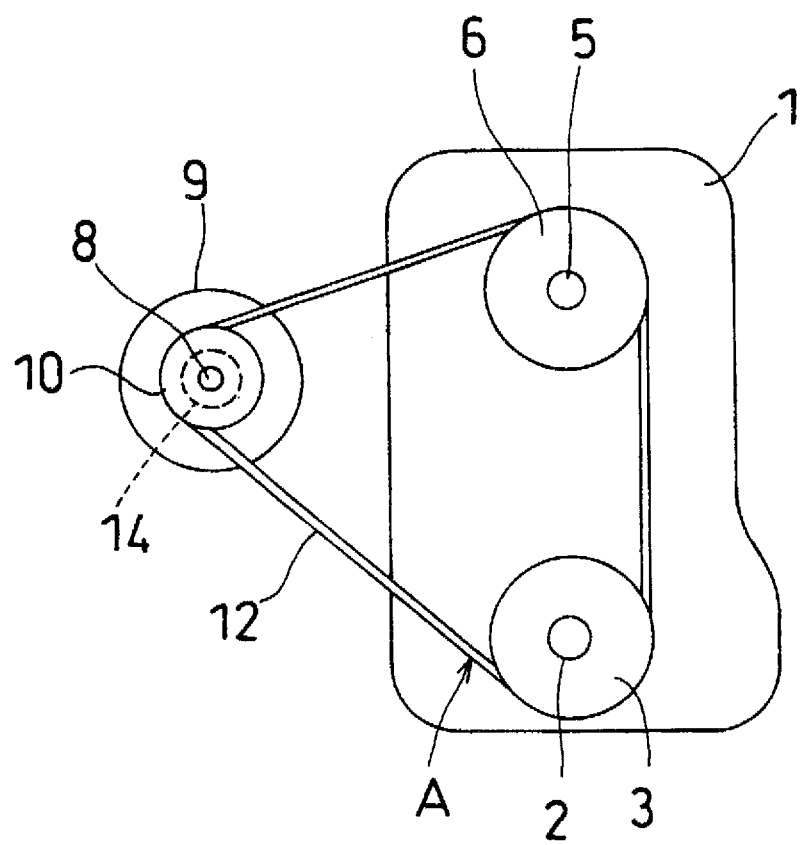
FIG. 3 is an elevational view schematically showing a belt transmission device.

FIG. 3 shows a belt transmission device A according to an embodiment of this invention. The belt transmission device A is for driving an alternator as an auxiliary of an automobile.

FIG. 3, reference numeral 1 indicates a diesel engine mounted on the automobile. 2 indicates a crank shaft supported at a lower part of the engine 1. The crank shaft 2 forms a driving rotary shaft accompanied with a slight variation in angular velocity. A crank pulley 3 having a set diameter, e.g., 135 mm, is attached to the crank shaft 2 so as to rotate integrally with it.

A pump shaft 5 parallel with the crank shaft 2 is supported at an upper part of the engine 1. The pump shaft 5 is connected to a non-shown water pump as another auxiliary so as to drive it. A pump pulley 6 having a set diameter, e.g., 135 mm, is attached to the pump shaft 5 so as to rotate integrally with it.

Alongside the engine 1, an alternator shaft 8 parallel with the crank shaft 2 is supported through a non-shown bracket. An alternator 9 is connected to the alternator shaft 8 so as to rotate integrally with it. The alternator shaft 8 is a driven rotary shaft exhibiting rotational inertia resulting from a load accompanied with generation of electric power by the alternator 9.

An alternator pulley 10 having a set diameter, e.g., 77 mm, is attached to the alternator shaft 8 so as to rotate integrally with it. A V-ribbed belt 12 is wound among the alternator pulley 10, the crank pulley 3 and the pump pulley 6. The rotation of the crank shaft 2 of the engine 1 is transmitted to the water pump and the alternator 9 through the V-ribbed belt 12 to drive these auxiliaries.

Figure 1:
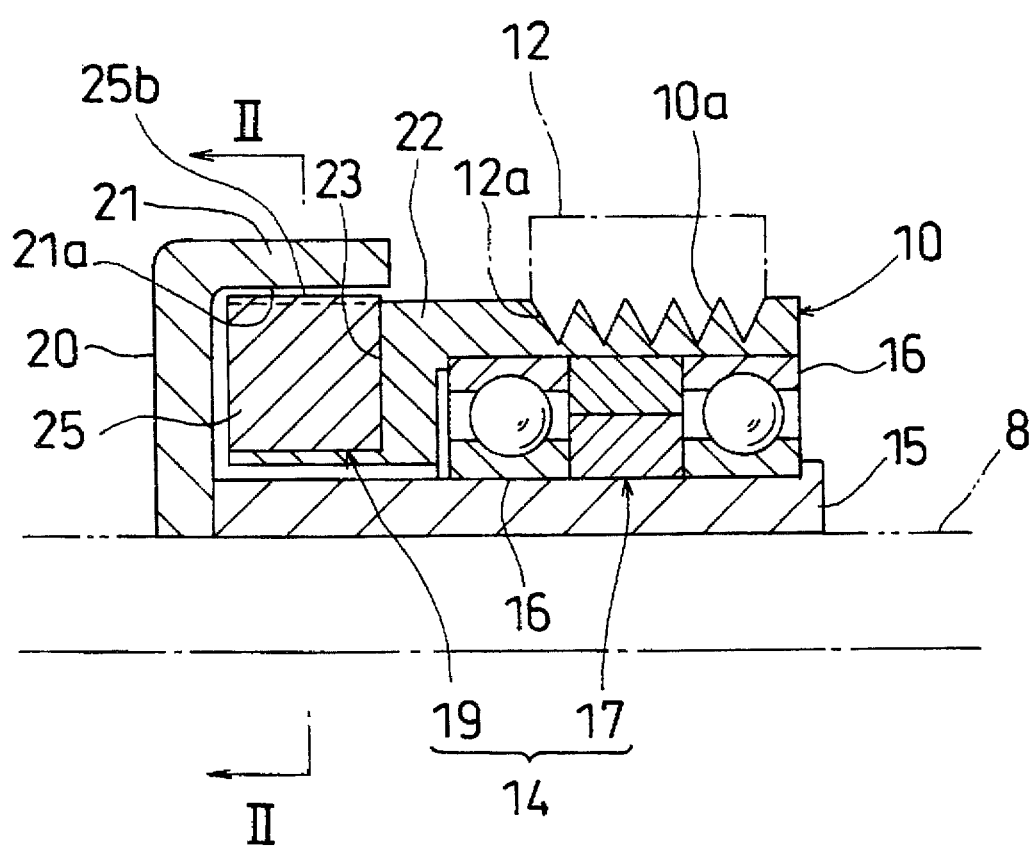
FIG. 1 is a sectional view taken along a shaft center of an alternator pulley in an embodiment of this invention.
Figure 2:
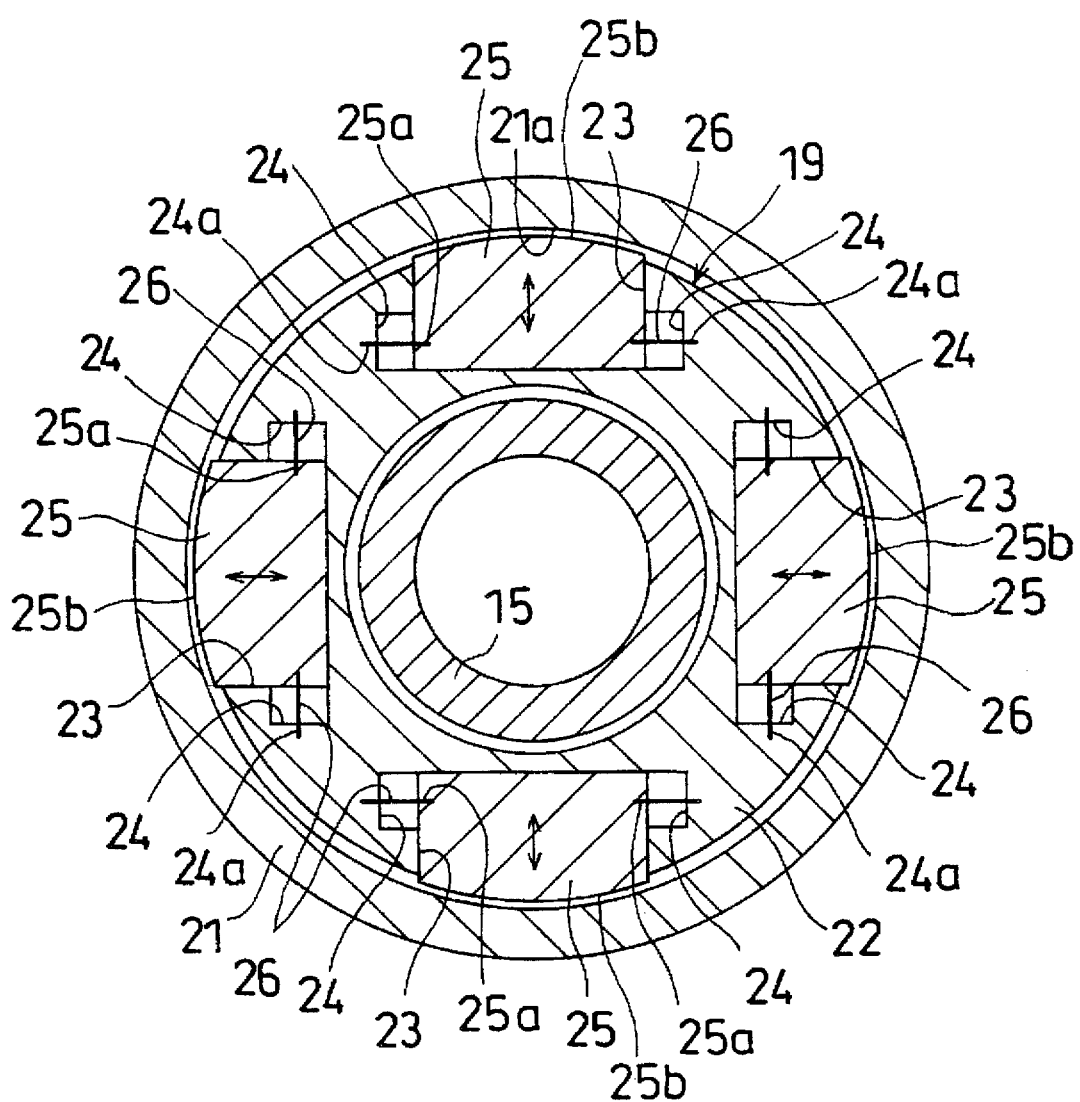
FIG. 2 is a sectional view taken on the line II—II of FIG. 1.

The alternator pulley 10 is attached to the alternator shaft 8 through a clutch device 14. The clutch device 14 has, as shown in detail in magnified views of FIGS. 1 and 2, a sleeve 15 which is engaged with the alternator shaft 8 from outside so as to rotate integrally with it. On the outer periphery of the sleeve 15, the alternator pulley 10 is rotatably supported through a pair of bearings 16, 16 with a space left in an axial direction (lateral direction of FIG. 1). On the outer periphery of the alternator pulley 10, pulley grooves 10a are formed so as to engage with ribs 12a of the V-ribbed belt 12. A one-way clutch 17 of roller type or ratchet type is disposed between both the bearings 16, 16. The one-way clutch 17 connects the alternator pulley 10 and the alternator shaft 8 so as to integrally rotate them only at the time of increase in angular velocity of the crank shaft 2 (alternator pulley 10), and disconnects the alternator pulley 10 and the alternator shaft 8 at the time of decrease in angular velocity of the crank shaft 2.

Forward of the one-way clutch 17, a centrifugal clutch 19 is disposed on a power transmission path from the alternator pulley 10 to the sleeve 15 so as to be parallel with the one-way clutch 17. The centrifugal clutch 19 has a flange 20 connected integrally to the front end of the sleeve 15. The flange 20 extends radially outward from the front end of the sleeve 15 and has a large diameter than the pulley 10. The peripheral end of the flange 20 is bent backward to form an annular clutch connection part 21 coaxial with the sleeve 15. A friction surface 21a is formed on the inner periphery of the clutch connection part 21.

On the contrary, the front end of the pulley 10 is extended forward to form a thick part 22. The inner end of the thick part 22 is located near the outer periphery of the sleeve 15 and the outer end of the thick part 22 is located near the inner periphery of the clutch connection part 21 of the flange 20. At the thick part 22, four weight engaging parts 23, 23 . . . which are each formed by cutting out the outer periphery of the thick part 22 in a central direction are provided with set spaces left circumferentially. Each of the weight engaging parts 23 has a bottom surface. The circumferentially adjacent side surfaces located forward and backward of the bottom surface are parallel with each other. A weight 25 having a set weight is radially slidably engaged with and supported to each of the weight engaging parts 23. The outer periphery of each of the weights 25 is formed in the same shape as the inner periphery of the clutch connection part 21, and is formed into a friction surface 25b engageable with the inner periphery of the clutch connection part 21 in an intimate contact.

Clipped concaves 24, 24 are formed on the circumferentially adjacent side surfaces of each of the weight engaging parts 23, respectively. An inserting part 24a is formed on the bottom of each of the concaves 24. An end of a leaf spring 26 is inserted into the inserting part 24a so as to be fixedly supported. The other end of the leaf spring 26 is inserted into an inserting part 25a formed on the corresponding surface of the weight 25 so as to be fixedly supported. The leaf spring 26 forcibly presses the weight 25 radially inward. When the number of rotations of the diesel engine 1 is smaller than a set number of rotations, e.g., 1800 rpm, corresponding roan allowable frequency of the one-way clutch 17 and an angular velocity of the alternator pulley 10 on the driving side is smaller than a set value, the leaf springs 26, 26 forcibly press each weight 25 to move it radially inward so that the friction surface 25a on the outer periphery of the weight 25 is moved away from the friction surface 21a on the inner periphery of the clutch connection part 21. Thereby, the connection of the pulley 10 and the alternator shaft 8 by the centrifugal clutch 19 is released. On the other hand, when the number of rotations of the engine 1 is the set number of rotations or more and the angular velocity of the alternator pulley 10 is the set value or more, a centrifugal force acting on each weight 25 is increased to move the weight 25 radially outward against the pressing force of the leaf springs 26, 26, so that the friction surface 25b on the outer periphery of the weight 25 is made contact with the friction surface 21 a on the inner periphery of the clutch connection part 21 by pressure. Thereby, the centrifugal clutch 19 is made in its connection state to connect the pulley 10 and the alternator shaft 8 so as to integrally rotate them.

Description is made next about a belt transmission method according to the invention.

When the diesel engine 1 is activated, the rotational driving force of the crank shaft 2 of the engine 1 is transmitted to the water pump and the alternator 9 as auxiliaries of the engine 1 through the V-ribbed belt 12 so that these auxiliaries are driven.

In the alternator 9, the clutch device 4 is interposed between the alternator pulley 10 and the alternator shaft 8 to adjust the transmission of the driving force. In detail, when the number of rotations of the engine 1 is lower than the set number of rotations of 1800 rpm corresponding to the allowable frequency of the one-way clutch 17 and the angular velocity of the alternator pulley 10 is lower than the set value, the centrifugal force acting on each weight 25 of the centrifugal clutch 19 of the clutch device 4 is smaller than the pressing force of the leaf springs 26, 26. Accordingly, each weight 25 moves radially inward by the pressing force of the leaf springs 26, 26 so that the friction surface 21b on the outer periphery of the weight 25 is away from the friction surface 21a on the inner periphery of the clutch connection part 21 thereby making the centrifugal clutch 19 in a non-connection state. As a result, the pulley 10 and the alternator shaft 8 are not connected through the centrifugal clutch 19 but connected through the one-way clutch 17 arranged in parallel with the centrifugal clutch 19.

If the clutch device 14 is not provided in the above case, when the angular velocity of the alternator pulley 10 shifts from its increasing area to its decreasing area, the alternator shaft 8 connected to the alternator 9 to have a large rotational inertial force cannot follow the shift to the decreasing area of the angular velocity so that the inertial force increases the angular velocity of the alternator shaft 8 as compared with that of the belt 12. The difference between both the angular velocities at that time causes a slip of the belt 12. In the method of this invention, however, the pulley 10 and the alternator shaft 8 are connected through the one-way clutch 17 only at the increasing area of the angular velocity thereby transmitting the driving force. Thus, while the transmission of the driving force from the pulley 10 as a driving side to the alternator shaft 8 is blocked at the time of decrease in angular velocity, the rotation of the alternator shaft 8 which temporarily becomes a larger number of rotations than that of the pulley 10 is accepted. Accordingly, the belt 12 contacts only the pulley 10 having a rotational inertial force far lower than the alternator shaft 8, so that no slip generates between the pulley 10 and the belt 12 or an extremely slight slip due to the inertial force provided only by the pulley 10 generates in spite of maintenance of the connection state of the pulley 10 and the belt 12. This can extend the life of the belt 12 and restrict generation of sounds.

Further, since the angular velocity of the alternator shaft 8 is held high even at the time of decrease in angular velocity of the pulley 10, the angular velocity of the alternator shaft 8 is higher than that of the pulley 10 as a whole, thereby increasing the angular velocity of the alternator shaft 8. Accordingly, a generating efficiency of the alternator 9 connected to the alternator shaft 8 can be increased.

On the contrary, when the number of rotations of the engine 1 rises to the set number of rotations or more so that the angular velocity of the alternator pulley 10 becomes the set value or more, the centrifugal force acting on each weight 25 of the centrifugal clutch 19 becomes larger than the pressing force of the leaf springs 26, 26. Thus, each weight 25 moves radially outward against the pressing force of the leaf springs 26, 26 so that the friction surface 25b on the outer periphery of the weight 25 comes into contact with the friction surface 21a on the inner periphery of the clutch connection part 21 by pressure so as to be engaged with it, thereby making the centrifugal clutch 19 in a connection state. The operation of the centrifugal clutch 19 blocks the function of the one-way clutch 17 so that the pulley 10 and the alternator shaft 8 are rigidly connected by the connection of the centrifugal clutch 19 so as to be rotated integrally with each other. As mentioned above, since the function of the one-way clutch 17 is blocked when the angular velocity of the alternator pulley 10 becomes the set value corresponding to the allowable frequency of the one-way clutch 17 or more, the one-way clutch 17 never operates over the allowable frequency thereby enhancing its durability.

Furthermore, when the number of rotations of the engine rises to the set number of rotations or more, the centrifugal clutch 19 operates to connect the pulley 10 and the alternator shaft 8 so as to integrally rotate them. Accordingly, it never occurs that the alternator shaft 8, i.e., the alternator 9, is excessively increased in number of rotations by its rotational inertia, thereby appropriately regulating the maximum number of rotations.

Meanwhile, in the connection state of the centrifugal clutch 19, since the pulley 10 and the alternator shaft 8 are directly connected so as to rotate integrally, the alternator shaft 8 receives the variation in angular velocity transmitted from the crank shaft 2 to the pulley 10 through the belt 12. However, since the number of rotations of the engine is large, the angular velocity at that time is large and therefore the variation in angular velocity becomes relatively small. That is, since the pulley 10 and the alternator shaft 8 are integrally connected only at the time of large number of rotations of the engine 1 in the above way, there is not much of a bad influence upon extension of life and reduction in sound of the belt 12 as a whole.

Further, since the pulley 10 and the alternator shaft 8 are connected in parallel with each other through both the one-way clutch 17 and the centrifugal clutch 19, if the one-way clutch 17 causes an operational defect so that power transmission is not made between the pulley 10 and the alternator shaft 8, the alternator 9 generates no electric power when the number of rotations of the engine is lower than the set value. At this time, normally, a charge lamp or the like used for detection of generation defects of the alternator 9 lights up. On the contrary, when the number of rotations of the engine becomes the set value or more, the centrifugal clutch 19 operates to make power transmission between the pulley 10 and the alternator shaft 8 so that generation of electric power is performed by the alternator 9. In short, when abnormal conditions are encountered in the one-way clutch 17, this can be recognized by the illumination of the charge lamp or the like as well as a minimum amount of generation of electric power by the alternator 9 can be secured.

In the above embodiment, the clutch device 4 is interposed between the alternator pulley 10 and the alternator shaft 8. However, the clutch device 4 may be interposed between the crank pulley 3 and the crank shaft 2 or may be interposed between the alternator pulley 10 and the alternator shaft 8 and between the crank pulley 3 and the crank shaft 2.

Further, the above embodiment is applied to the case of driving the alternator 9 with the engine 1. However, this invention may be applied to the case of driving auxiliaries other than the alternator 9 and other equipments on the rotary shaft. If only it is a belt transmission device for transmitting a rotational force of a driving rotary shaft accompanied with a slight variation in angular velocity to a driven rotary shaft having rotational inertia through the belt 12, it can apply this invention.

Also in the case of using, as a transmission belt, a V-belt or other types of transmission belts instead of the V-ribbed belt 12, same effects can be displayed.

Figure 4:
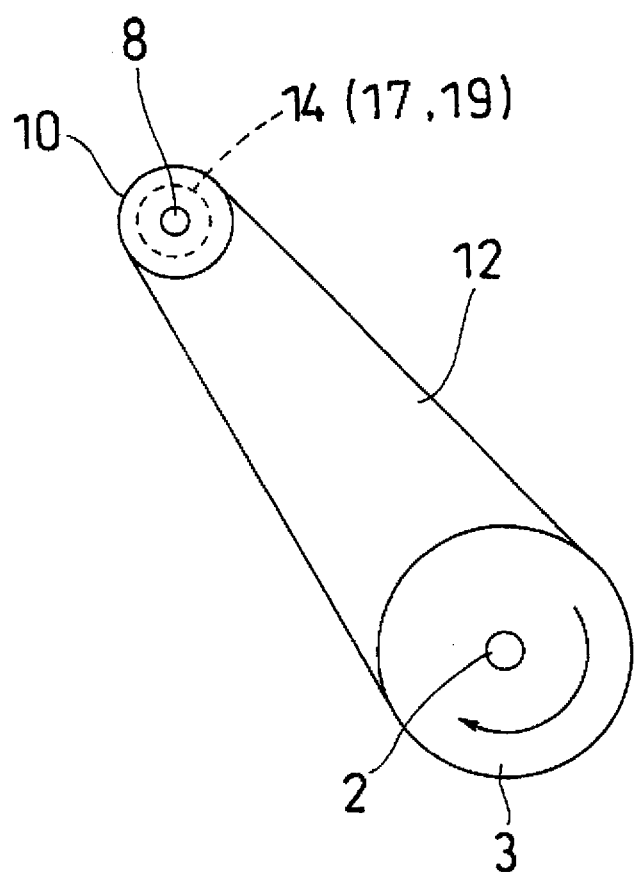
FIG. 4 is a diagram showing test conditions.

Next, description is made about a concrete example of this invention. As shown in FIG. 4, a crank pulley 3 having a 125 mm diameter is attached to a crank shaft 2 of a four-cylinder diesel engine 1 and an alternator pulley 10 having a 60.8 mm diameter is attached to an alternator shaft 8 connected to an alternator (not shown). A V-ribbed belt 12 is wound between both the pulleys 3, 10 so as to drive the alternator by the engine 1. The maximum load of the alternator is set to the time of generation of 28 amperes of electric power.

Figure 5:
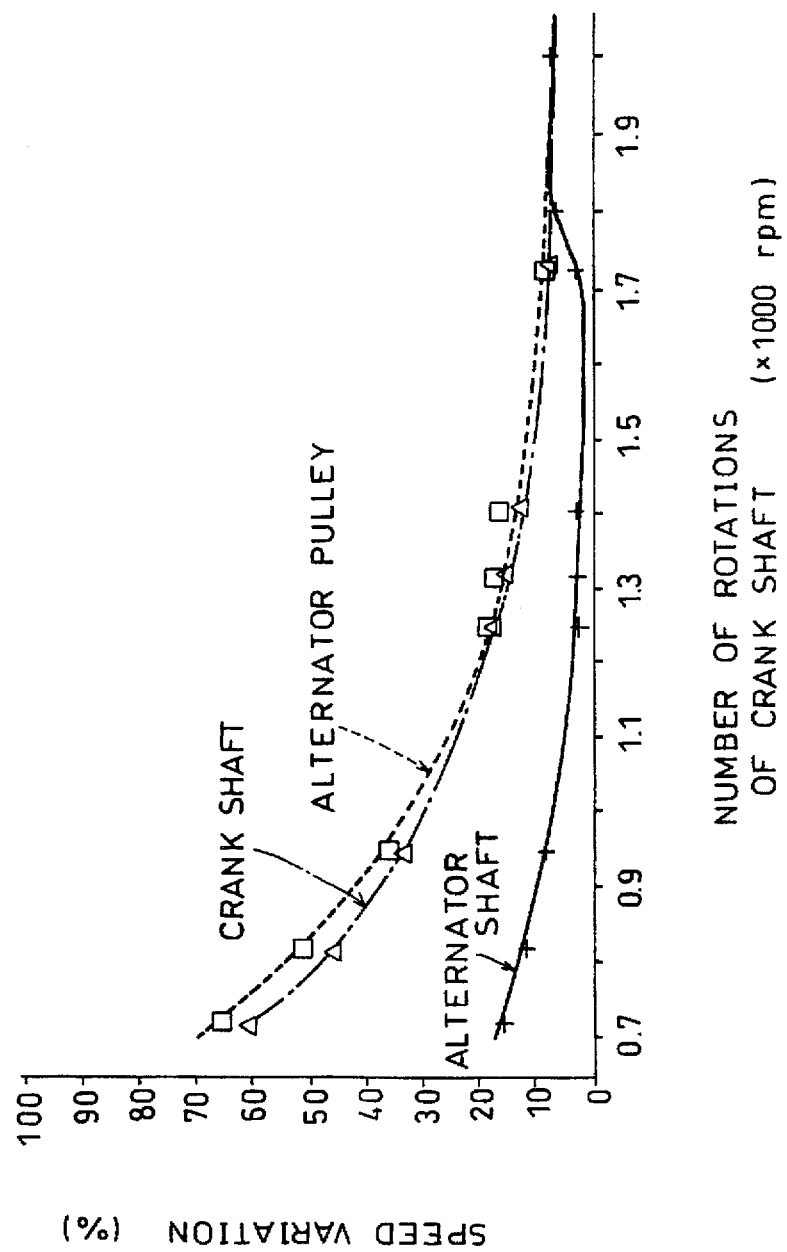
FIG. 5 is a diagram showing respective characteristics in rate of speed variation of elements with respect to the number of rotations of a crank shaft at the state that a set load is applied to an alternator.

In the example of this invention in which a clutch device 4 composed of a one-way clutch 17 and a centrifugal clutch 19 is interposed between the alternator pulley 10 and the alternator shaft 8, respective rates of speed variation of the crank shaft 2, the alternator pulley 10 and the alternator shaft 8 were examined when the number of rotations of the, engine, i.e., the number of rotations of the crank shaft 2, were changed within 700 to 2000 rpm under the conditions that the load of the alternator was set to the time of generation of 19 amperes of electric power, thereby obtaining examination results shown in FIG. 5.

Figure 6:
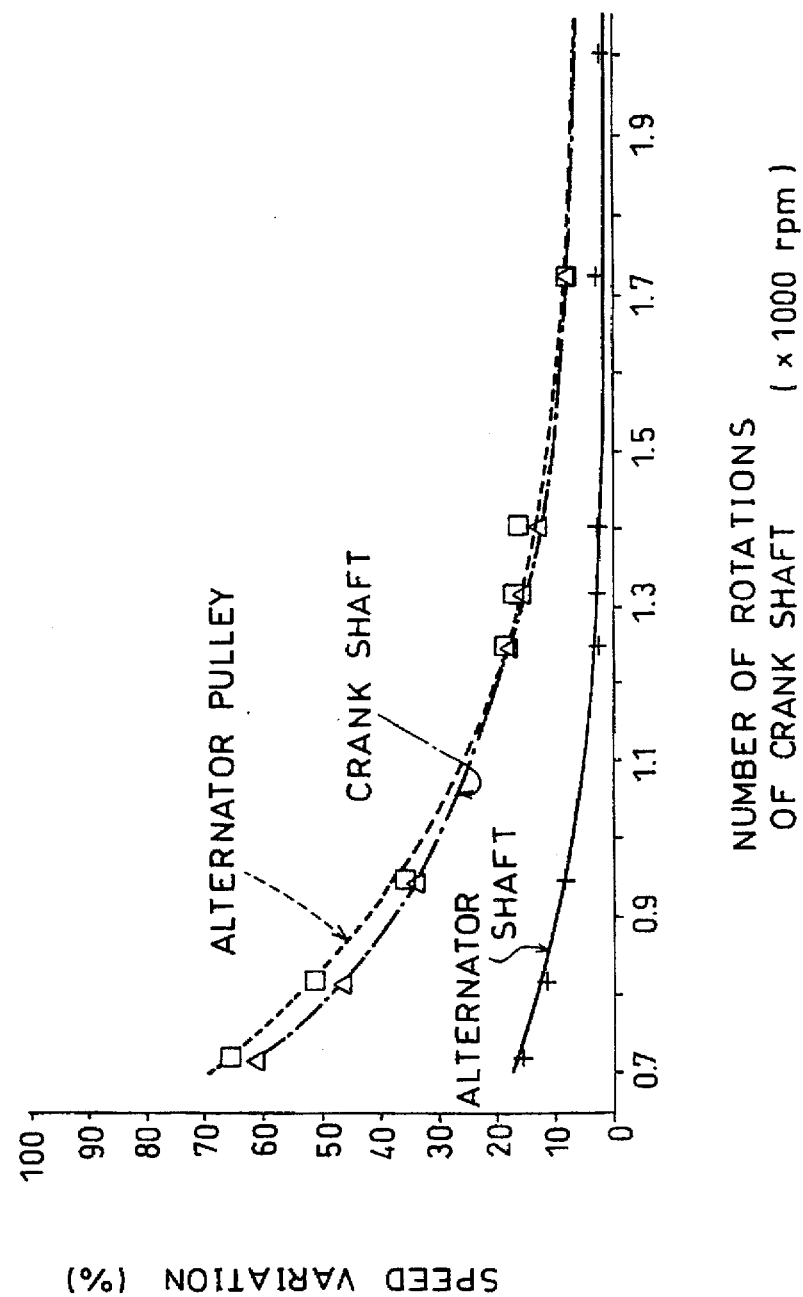
FIG. 6 is a diagram showing a prior art, which corresponds to FIG. 5.
Figure 7:
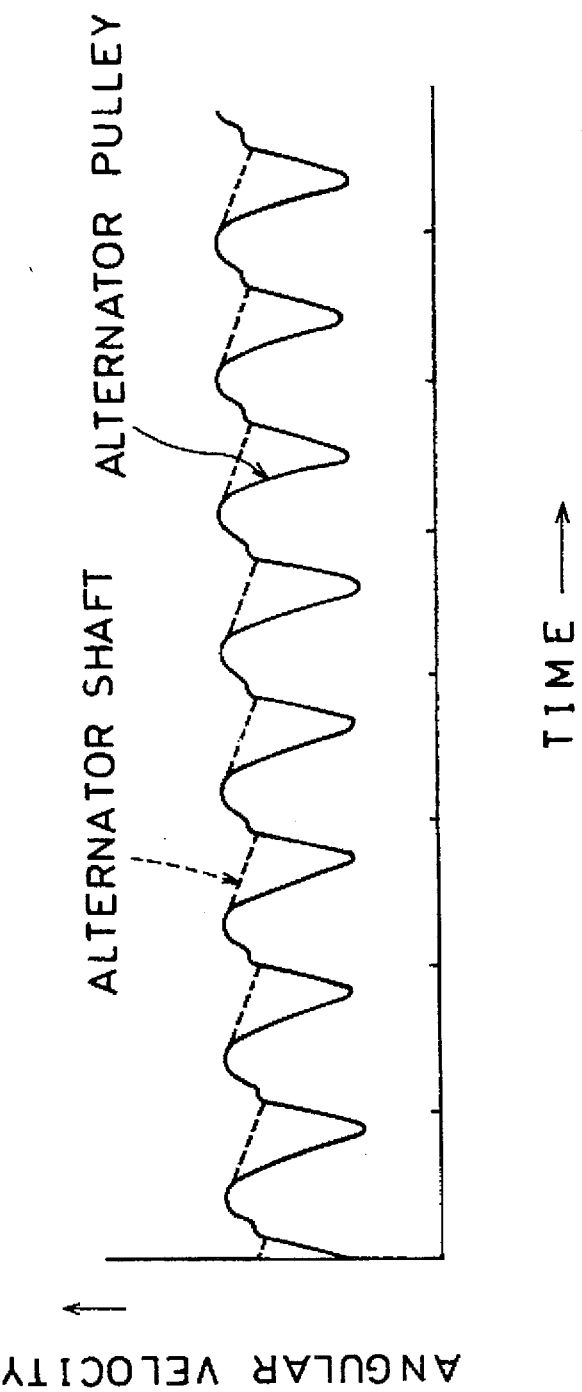
FIG. 7 is a diagram showing variations in angular velocity of the crank shaft when it is rotated at a set number of rotations.

In addition, with respect to a conventional example in which only the one-way clutch 17 is interposed between the alternator pulley 10 and the alternator shaft 8, respective rates of speed variation of the alternator pulley 10 and the alternator shaft 8 were examined under the same conditions, thereby obtaining examination results shown in FIG. 6. FIG. 7 shows actual speed variations of the alternator pulley 10 and the alternator shaft 8 at the idle time when the number of rotations of the engine is 800rpm.

When FIGS. 5 and 8 are compared, the conventional example having only the one-way clutch 17 does not transmit a speed variation of the alternator pulley 10 to the alternator shaft 8 when the number of rotations of the engine is 700 to 2000 rpm, as shown in FIG. 6. That is, regardless of the relationship that the pulley on the alternator shaft 8 as a driven side is smaller in diameter than the crank pulley 3 on the crank shaft 2 as a driving rotary shaft so that the alternator shaft 8 may be increased in velocity with respect to the crank shaft 2, almost no variation in angular velocity on the alternator shaft 8 side occurs so that the angular velocity is substantially stable.

On the contrary, when the one-way clutch 17 is provided with the centrifugal clutch 19, the centrifugal clutch 19 does not operate but only the one-way clutch 17 operates when the number of rotations of the engine is smaller than 1700 rpm, as shown in FIG. 5. As in the above conventional example, no speed variation of the alternator pulley 10 is transmitted to the alternator shaft 8. However, as the number of rotations rises over 1700 rpm, the centrifugal clutch 19 gradually becomes in its connection state and a speed variation of the alternator shaft 8 get closer to a rate of speed variation of the alternator pulley 10 and reaches it finally. That is, according to this invention, when the number of rotations of the engine exceeds the allowable frequency of the one-way clutch 17, the operation of the one-way clutch 17 can be blocked thereby increasing the durability of the one-way clutch 17.

I claim:

1. A belt transmission method of transmitting a rotational force of a driving rotary shaft which rotates constantly in a single angular direction with variations in angular velocity, to a driven rotary shaft having rotational inertia, said transmitting being conducted through a transmission belt running constantly in a single angular direction and connected between said driving rotary shaft and said driven rotary shaft, comprising the steps of:

selectively breaking the transmission of rotation from one to the other between said belt and said driven rotary shaft through a clutch means only at a time of decrease in angular velocity of said driving rotary shaft and only when one of said driving and driven rotary shafts is rotating at an angular velocity that is smaller than a set value; and allowing a continuous transmission of rotation from one to the other between said belt and said driven rotary shaft through said clutch means when one of said driving and driven rotary shafts is rotating at an angular velocity that is greater than said set value in order to reduce the wear of said clutch means.

2. A belt transmission device comprising:

pulleys provided with a driving rotary shaft accompanied with a slight variation in angular velocity and a driven rotary shaft having rotational inertia respectively;

a transmission belt wound between both said pulleys; and a clutch device through which at least one of said pulleys on said driving and driven rotary shafts is attached to said rotary shaft, said clutch device comprising:

a one-way clutch for connecting said pulley and said rotary shaft so as to integrally rotate them only in the case of increase in angular velocity of said driving rotary shaft; and a centrifugal clutch, provided in parallel with said one-way clutch on a transmission path, for disconnecting said pulley and said rotary shaft when the angular velocity of one of said rotary shafts is smaller than a set value and for connecting said pulley and said rotary shaft so as to integrally rotate them when the angular velocity of said driving rotary shaft is the set value or more.

3. A belt transmission device according to claim 2, wherein said clutch device is interposed between said driven rotary shaft and said pulley on said driven rotary shaft, said one-way clutch of said clutch device is disposed between said driven rotary shaft and said pulley rotatably supported on said driven rotary shaft via a bearing, said centrifugal clutch comprises a clutch connection part which is formed on said driven rotary shaft so as to rotate integrally with said driven rotary shaft and has a friction surface at an inner periphery thereof, at least one weight which is supported to said pulley so as to be movable in a radial direction of said pulley and has a friction surface engageable with the friction surface of said clutch connection part at an outer periphery thereof, and pressing means for forcibly pressing said weight radially inward, and said weight moves radially outward by a centrifugal force so that the friction surface thereof is engaged with the friction surface of said clutch connection part.

4. A belt transmission device according to claim 2 or 3, wherein said driving rotary shaft is composed of a crank shaft of an engine, and said driven rotary shaft is composed of a shaft connected to an auxiliary driven by the engine.

5. A belt transmission device according to claim 4, wherein the auxiliary is an alternator.

* * * * *